April 2, 1968        A. QUENOT        3,375,590

TAPE MEASURE

Filed Jan. 13, 1967        3 Sheets-Sheet 1

Inventor:
André Quenot
By Robert E. Burns atty

April 2, 1968  A. QUENOT  3,375,590
TAPE MEASURE

Filed Jan. 13, 1967  3 Sheets-Sheet

United States Patent Office 3,375,590
Patented Apr. 2, 1968

3,375,590
TAPE MEASURE
André Quenot, % Zone Industrielle Trepillot, Boite Postale 256, Besancon, 25, France
Continuation-in-part of application Ser. No. 473,281, July 20, 1965. This application Jan. 13, 1967, Ser. No. 609,087
Claims priority, application France, June 8, 1965, 19,881
12 Claims. (Cl. 33—138)

ABSTRACT OF THE DISCLOSURE

Tape measure having a coiled, pull out tape on a rotating drum inside a casing formed of two compressible half-shells secured together in and by a sheath having a transparent top through which the tape markings are viewed.

---

This application is a continuation-in-part of Ser. No. 473,281, filed on July 20, 1965, now abandoned.

Portable linear measuring instruments comprising a flexible measuring tape of any length, for example of metal or textile material, enclosed in a casing, are well-known in the art.

The casing is usually composed of two half-shells connected to each other by screwing, adhesion or the like. When the half-shells are of metal, the number of screwing points may be few owing to the rigidity of the metal, but the weight of the measuring instrument is increased and the cost price is relatively high. When the two half-shells are made of plastic, for example nylon, they have to be thick enough for the casing to have the required qualities of mechanical resistance. Furthermore, the flexibility of plastic material involves deformation of the casing by compression: finally, the screwing has to be performed at several points in order to ensure close contact between the half-shells, even if they have undergone deformation by shrinkage after moulding.

In casings of this kind, whether of metal or plastic, the presence of external screws incites the user to dismantle the measuring instrument in order to see how it works. This is obviously deleterious to the subsequent use of the instrument. These screws moreover often spoil the look of the casing.

The present invention therefore proposes to provide a casing for linear measuring instruments which combines the advantages of lightness and long life of plastic material with rigid fixing of the two compressible half-shells forming the casing, the two halves being assembled without the use of screws.

The invention is characterised in that a tape measure casing is formed of two compressible half-shells secured by a force fit in an external sheath having internal dimensions equal to the external dimensions of the two half-shells in which the shells are substantially completely encased.

The invention will be better understood from the following description given as a non-limitative example with reference to the accompanying drawing in which.

The invention is described by way of example, with respect to a known linear measuring instrument comprising an upper window on the casing to permit direct reading in the case of internal measurements. However, it is obvious that it is in no way limited thereto and may be applied to any linear measuring instrument comprising a measuring tape of any length enclosed in a casing formed of two half-shells.

Figure 1:
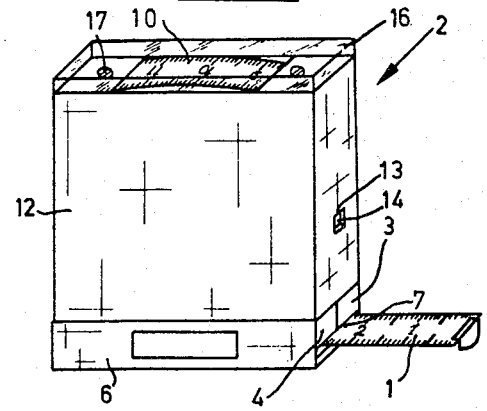
FIGURE 1 is a perspective view of one embodiment of the linear measuring instrument according to the invention.
Figure 2:
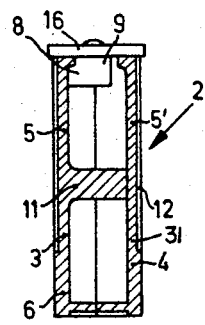
FIGURE 2 is a cross-section of the casing of the measuring instrument of FIGURE 1.
Figure 3:
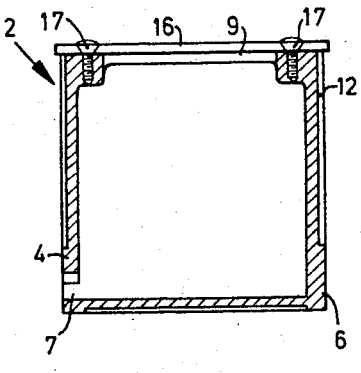
FIGURE 3 is a longitudinal section of the casing of the measuring instrument of FIGURE 1.

FIGURES 1 to 3 show a first embodiment of the invention.

The linear measuring instrument comprises a measuring tape 1 enclosed in a casing 2 of generally parallelepipedal shape. The casing 2 consists of two compressible half-shells 3 and 4, which are moulded of nylon, polystyrene, polyethylene, or other compressible material equivalent thereto. On their upper parts, the two half-shells 3 and 4 have a reduced section 5 and 5' respectively. The lower part 6, has an enlarged section forming a base and permits the measuring tape 1 to emerge through complementary cut outs of the shells forming a slot 7. The upper part of this section forms a shoulder 31. The lateral edges of the tape 1, usually of metal or textile, are therefore guided against the two half-shells 3 and 4 of plastic material, therefore in optimum conditions of friction and in guiding grooves as shown by 30 in FIGURES 7 and 8 formed by projections. In this way the tape is made self-lubricating.

The two half-shells 3 and 4 have at the top two complementary cut outs 8 and 9, respectively, which define reading window 10 for the direct reading of internal measurements. One of the two half-shells, for example 3, has central shoulder 11, for example cylindrical, acting as crosspiece between the reduced sections 5 and 5' of the half-shells 3 and 4 adapted to receive rotatably the winding drum of the measuring tape formed, for example as in FIGURES 7 and 8, of two discs 32 and 34.

Figure 6:
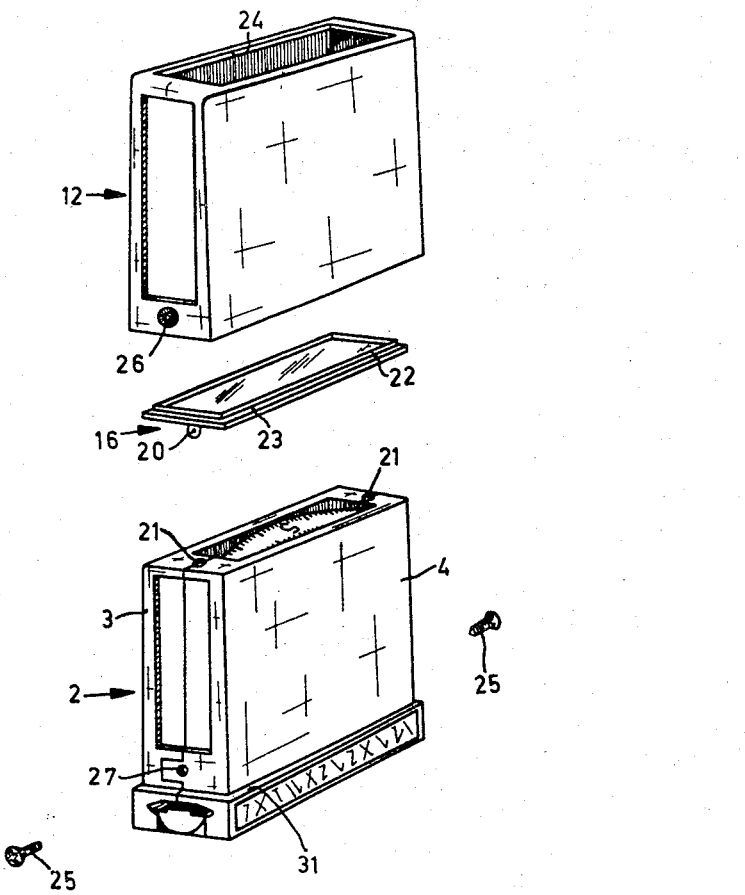
FIGURE 6 is an exploded perspective view of another alternative.
Figure 7:
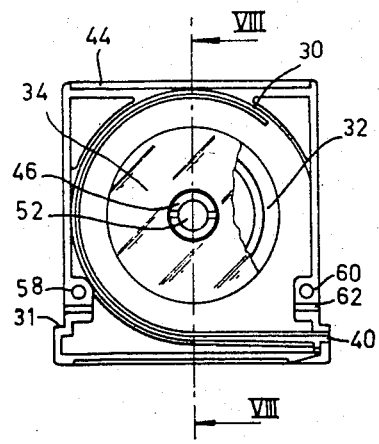
FIGURE 7 is an inside view of one of the half-shells.
Figure 8:
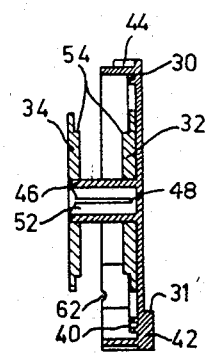
FIGURE 8 is a cross-sectional view taken along line VIII—VIII of FIGURE 7.

The two half-shells 3 and 4 are clamped together by tubular open-ended sheath 12, for example of chromium-plated brass or of any of the plastic materials mentioned above. The sheath 12 has an internal surface exactly adapted to the outside of the two half-shells 3 and 4. Sheath 12 is mounted on the upper surface of the casing, which is of reduced cross-section and its lower edge abuts against shoulder or rim 31 of the two half-shells. Preferably the thickness of the sheath is equal to the width of the rim, as shown in FIGURES 6, 7 and 8.

The whole is completed by a transparent plate 16, for example, of plexiglass, fixed to the casing by two screws 17: the plate 16 enables the digits to be read through the windows 10. The plate 16, which overlaps the end of sheath 12, seals the latter against dust and the like.

The lower part 6 forming the base of the casing can carry various inscriptions and symbols which can be moulded with the casing itself. The sheath 12 may also carry special inscriptions, formed for example by engraving.

Figure 4:
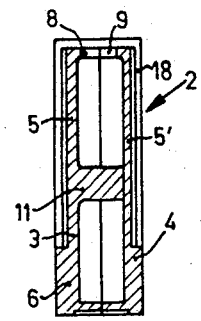
FIGURE 4 is a similar view to FIGURE 2, for an alternative embodiment.
Figure 5:
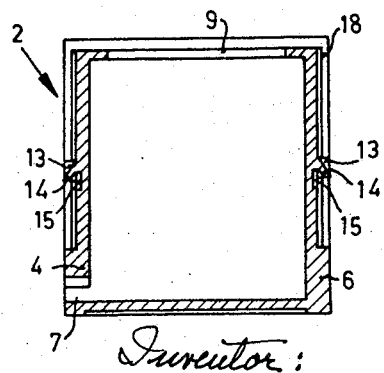
FIGURE 5 is a similar view to FIGURE 3 for the alternative of FIGURE 4.

FIGURES 4 and 5 describe an alternative embodiment of the invention, using the same references for the same parts.

The two half-shells 3 and 4 are identical with those of the first embodiment. Tubular sheath 12 and plate 16 in this case are replaced by transparent sleeve 18, for example of plexiglass, having two (for example diametrically opposed rectangular) apertures 13, which for greater rigidity cooperate with tongues 14 moulded with each half-shell, the dismantling requiring a tool to push back the projecting tongue 14 in seating 15 provided in the wall of the casing for the purpose. This arrangement permits screws 17 to be omitted. Moreover, the transparency of sleeve 18 permits the arrangement in cavities (not shown) provided in lateral and/or frontal surfaces of the casing, of plates bearing publicity or other useful information, which are thus easily interchangeable. These plates, for example, made of oxidized aluminium, might merely be placed without gluing and clipping and might be very thin, since they are protected by sleeve 18.

In this embodiment clipping of the sleeve to the half-shells may be replaced by screwing, or the sleeves may be made resiliently strong enough to clamp the half-shells without other means.

The complete similarity of half-shells 3 and 4 in the first and second embodiments will enable the manufacturer to supply, as he chooses, measuring instruments of either embodiment, merely changing the outer assembly piece of the casing.

FIGURE 6 describes another alternative embodiment.

Here, the measuring instrument comprises the two compressible half-shells 3 and 4, for example of moulded nylon, forming the casing 2. Transparent plate 16 is fixed in position in relation to the casing 2 by means of two studs 20 cooperating with two apertures 21 in the upper surface of casing 2. Plate 16 has a peripheral groove 22 defining a thin rim 23. Tubular sheath 12 for example of opaque or transparent plastic, is fitted on to casing 2 over plate 16. The top of the sheath 12 has a rectangular opening 24 of the same dimensions as peripheral groove 22 resulting from folding down said top. In this way sheath 12, when in place, holds plate 16 by resting on rim 23. Sheath 12 is held on the casing in any suitable way, for example, by two screws 25 passing through holes 26 bored in the sheath 12 and cooperating with tapped apertures 27 in casing 2. Preferably fixing is effected by clipping as described for the previous embodiments or with a single screw. This embodiment has the particular advantage, also offered by that of FIGURES 1 to 3, of allowing easy access to the lower surface of plate 16.

Of course, any combinations or variants of detail would also come within the scope of the invention. The sheath or sleeve might cover the entire height of the measuring instrument omitting enlarged section or base 6. There might be a sheath 12 of opaque or transparent plastic. Similarly an opaque plastic or metal sleeve 18 might be used. The introduction of a sheath 12 can be effected via the lower part of the casing or even laterally.

Figure 9:
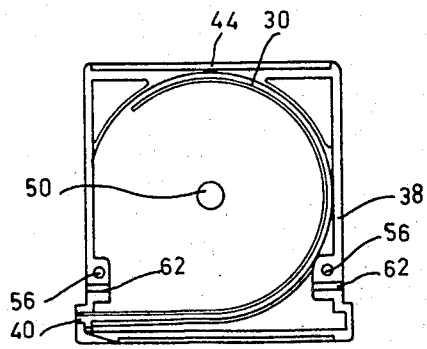
FIGURE 9 is an inside view of the other half-shell.

An improved modification of the invention showing in detail the winding drum thereof and other structural features is shown on FIGURES 7, 8 and 9.

As shown, the device comprises half-shells 34 and 38 having molded therein channels 30 which tangentially terminate at outlet opening 40 at the enlarged or lower base section thereof 42. Base section 42 has a surrounding rim 31 against which the lower part of a sheath such as 12 (FIGURE 6) abuts. The upper portion of the half-shells have a depressed peripheral rim or seat 44 adapted to receive a transparent plate such as 16 but without studs 20 which will be secured in place by the sheath as in FIGURE 6.

Half-shell 36 has a central shaft 46 molded integrally therewith. This shaft is hollow and has a transversal slot 48 therein for inserting the inner end of a return spring (not shown) to the outer end of which may be secured the inner end of the measuring tape as is conventional in this art.

Molded integrally with half-shell 38 is a central boss 50 adapted to enter into cavity 52 of shaft 46 to reinforce the same.

Freely mounted on shaft 46 are discs 32 and 34. As shown on FIGURE 8, these discs have oppositely facing inner hubs 54 on which a measuring tape is wound.

For greater rigidity and better contact, half-shell 38 has a pair of projecting studs 56 which fit in corresponding holes 58 and 60 of half-shell 36 when the unit is assembled. Semi-circular tapped screw openings 62 are provided in the half-shells in which may be placed, after assembly but before placing the sheath, screws (not shown) intended to reinforce the unit.

If desired, the shaft and consequently the winding drum can be positioned eccentrically with respect to the half-shells.

What is claimed is:

1. In a linear measuring instrument, a casing consisting of two compressible half shells having a top and a bottom; a winding drum in said casing, a coiled, pull-out tape wound on said drum; each of said half-shells having cut-outs at the top thereof forming a reading window for said tape and at the bottom thereof forming an outlet for said tape; each of said shells having an upper and a lower section, said upper section being substantially longer than said lower section, said upper section being recessed whereby said lower section forms a surrounding rim; said half-shells having on the inside thereof oppositely facing projections forming guides for said tape; a sheath having opened upper and lower ends, said sheath receiving and clamping together said half-shells in assembled relation; said sheath covering substantially said upper sections of said half-shells, said lower end of said sheath abutting said rim and, a transparent plate secured over said reading window covering entirely said upper end of said sheath.

2. Instrument according to claim 1 wherein said sheath has a plurality of openings and each of said half-shells has seatings therein with tongues projecting therefrom and fitting in said openings of said sheath.

3. Instrument according to claim 1 wherein said sheath is transparent.

4. Instrument according to claim 1 wherein one of said half-shells has an open-ended shaft integrally molded therewith, cooperating discs rotatably mounted on said shaft to form said winding drum for said tape, the other of said half-shells having a projection fitting in said shaft to reinforce the same.

5. Instrument according to claim 1 wherein one of said half-shells has a plurality of internally projecting pins and the other of said half-shells has corresponding openings receiving said pins for securing said half-shells together.

6. Instrument according to claim 1 wherein said lower section of said shells forms a base for said instrument, said base having therein said outlet for said tape, said oppositely facing projections terminating tangentially in said outlet.

7. In a linear measuring instrument, a casing consisting of two compressible half-shells having a top and a bottom; a winding drum in said casing, a coiled, pull-out tape wound on said drum, each of said half-shells having cut-outs at the top thereof forming a reading window for sead tape and at the bottom thereof forming an outlet for said tape; each of said shells having an upper and a lower section, said upper section being substantially longer than said lower section, said upper section being recessed whereby said lower section forms a surrounding rim; said half-shells having on the inside thereof oppositely facing projections forming guides for said tape; a sheath having opened upper and lower ends, said sheath receiving and clamping together said half-shells in assembled relation; said sheath covering substantially said upper sections of said half-shells, said lower end of said sheath abutting said rim, a transparent plate over said window, said plate having a peripheral groove therein, said opened upper end of said sheath being defined by a peripheral flange on an upper surface of said sheath, said flange being above and received by said groove to retain said plate in assembled relation with said casing.

8. Instrument according to claim 7 wherein said sheath has a plurality of openings and each of said half-shells has seatings therein with tongues projecting therefrom and fitting in said openings of said sheath.

9. Instrument according to claim 7 wherein said sheath is transparent.

10. Instrument according to claim 7 wherein one of said half-shells has an open-ended shaft integrally molded therewith, cooperating discs rotatably mounted on said shaft to form said winding drum for said tape, the other of said half-shells having a projection fitting in said shaft to reinforce the same.

11. Instrument according to claim 7 wherein one of said half-shells has a plurality of internal projecting pins and the other of said half-shells has corresponding openings receiving said pins for securing said half-shells together.

12. Instrument according to claim 7 wherein said lower section of said shells form a base for said instrument, said base having therein said outlet for said tape, said oppositely facing projection terminating tangentially in said outlet.

References Cited

UNITED STATES PATENTS

| | | | |
|---|---|---|---|
| 1,533,413 | 4/1925 | Heygel | 206—41 |
| 2,893,655 | 7/1959 | Carlson | 242—84.8 |
| 3,129,810 | 4/1964 | Wilkens | 206—52 XR |
| 3,216,117 | 11/1965 | Stowell | 33—138 |
| 3,255,531 | 6/1966 | Anderson | 33—138 |

LEONARD FORMAN, *Primary Examiner.*

J. M. FREED, *Assistant Examiner.*